United States Patent
Moening et al.

(10) Patent No.: US 7,631,556 B2
(45) Date of Patent: Dec. 15, 2009

(54) EMPTY FUEL LEVEL DETECTION CROSS-CHECK

(75) Inventors: Douglas J. Moening, Farmington, MI (US); Scott A. Kegebein, Howell, MI (US); Eric M. Hall, Rochester Hills, MI (US); Gary L. Rogers, Davison, MI (US); Zhong Wang, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 48 days.

(21) Appl. No.: 11/496,971

(22) Filed: Aug. 1, 2006

(65) Prior Publication Data

US 2008/0028851 A1 Feb. 7, 2008

(51) Int. Cl.
*G01F 23/00* (2006.01)

(52) U.S. Cl. .................................... 73/290 R

(58) Field of Classification Search ............ 73/113, 73/1.73, 290 R, 317
See application file for complete search history.

(56) References Cited

U.S. PATENT DOCUMENTS

| | | | | |
|---|---|---|---|---|
| 5,752,409 | A * | 5/1998 | Lippmann et al. | 73/290 R |
| 5,812,060 | A * | 9/1998 | DeSpain et al. | 340/618 |
| 6,002,328 | A * | 12/1999 | Wallrafen | 340/450.2 |
| 6,401,533 | B1 * | 6/2002 | Gier et al. | 73/313 |

* cited by examiner

*Primary Examiner*—Hezron Williams
*Assistant Examiner*—Mark Shabman

(57) ABSTRACT

A fuel level monitoring system for a fuel system having a primary fuel tank and a secondary fuel tank includes a fuel level sensor that is disposed within the secondary fuel tank and that generates a first signal. An empty switch is disposed within the secondary fuel tank and generates a second signal. A control module determines a condition of one of the fuel level sensor and the empty switch based on the first signal, the second signal and a plurality of signal thresholds.

23 Claims, 3 Drawing Sheets

EMPTY FUEL LEVEL DETECTION CROSS-CHECK

FIELD

The present disclosure relates to fuel level monitoring in a vehicle, and more particularly to monitoring a fuel level in a vehicle having primary and a secondary fuel tanks.

BACKGROUND

The statements in this section merely provide background information related to the present disclosure and may not constitute prior art.

Internal combustions engines combust an air and fuel (A/F) mixture within cylinders to produce drive torque. More specifically, the combustion events reciprocally drive pistons that drive a crankshaft to provide torque output from the engine. The fuel is delivered to the engine by a fuel system. The fuel systems of some vehicles include a plurality of fuel tanks. For example, some fuel systems include a primary fuel tank and a secondary fuel tank, wherein each fuel tank includes its own filler neck.

The fuel levels within the fuel tanks are monitored and the vehicle operator is informed as to the amount of fuel remaining in each tank. More specifically, a fuel level sensor is provided in each tank. Each fuel level sensor is responsive to the fuel level in the tank and generates a signal based thereon. The amount of remaining fuel is determined based on the signals.

Traditional fuel level monitoring control includes rationality diagnostics to determine whether the fuel level sensors are functioning properly. However, the traditional fuel level monitoring control rationality diagnostics are unable to discern between a fuel level signal that is stuck at empty and a fuel tank that has not had any fuel added. In most fuel system designs this is not an issue, because the fuel tank will be refueled on a regular basis.

In a dual fuel tank system having separate fueling necks, however, the vehicle operator often decides not to add fuel to the secondary fuel tank for an unspecified amount of time. That is to say that the traditional fuel level monitoring control can not diagnose whether a fuel level is stuck at empty versus resting at empty because no fuel has been added to the secondary fuel tank.

SUMMARY

Accordingly, the present invention provides a fuel level monitoring system for a fuel system having a primary fuel tank and a secondary fuel tank. The fuel level monitoring system includes a fuel level sensor that is disposed within the secondary fuel tank and that generates a first signal. An empty switch is disposed within the secondary fuel tank and generates a second signal. A control module determines a condition of one of the fuel level sensor and the empty switch based on the first signal, the second signal and a plurality of signal thresholds.

In one feature, the control module compares a sum of the first and second signals to each of the plurality of signal thresholds.

In other features, the control module sets a condition flag based on the condition. The condition flag indicates one of a fuel tank empty condition, a fuel tank full condition, a normal operating condition, an empty switch stuck condition and a fuel level sensor stuck condition. The control module generates a diagnostic trouble code and initiates an alert when the condition is one of an empty switch stuck condition and a fuel level sensor stuck condition.

In another feature, the first signal includes one of a first value, a second value and a third value.

In still other features, the fuel level sensor is a variable resistor. The empty switch is connected in electrical series with the fuel level sensor.

In yet another feature, the second signal includes one of a first and a second value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
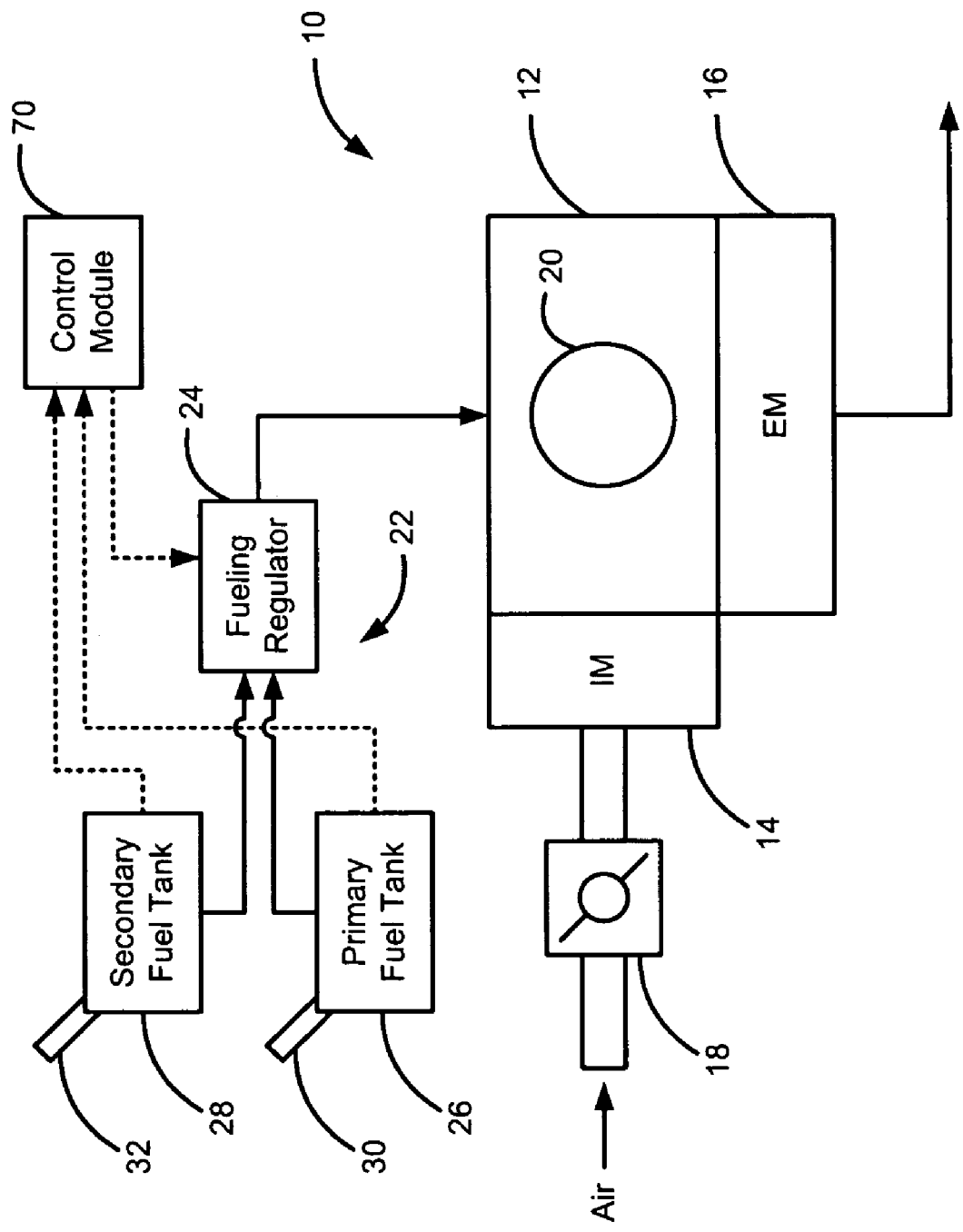
FIG. 1 is a functional block diagram of an exemplary vehicle system including a primary and a secondary fuel tank.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 includes an engine 12 having an intake manifold 14 and an exhaust manifold 16. Air is drawn into the intake manifold 14 through a throttle 18. The air is mixed with fuel, and the fuel and air mixture is compressed and ignited within a cylinder 20 to reciprocally drive a piston (not shown) within the cylinder. Although a single cylinder 20 is shown, it is anticipated that the engine can include a plurality of cylinders 20. The piston rotatably drives a crankshaft (not shown) to provide a drive torque output. Fuel is delivered to the engine by a fuel system 22, which includes a fuel regulator 24, a primary fuel tank 26 and a secondary fuel tank 28. The primary and secondary fuel tanks 26, 28 include respective fueling necks 30, 32.

Figure 2:
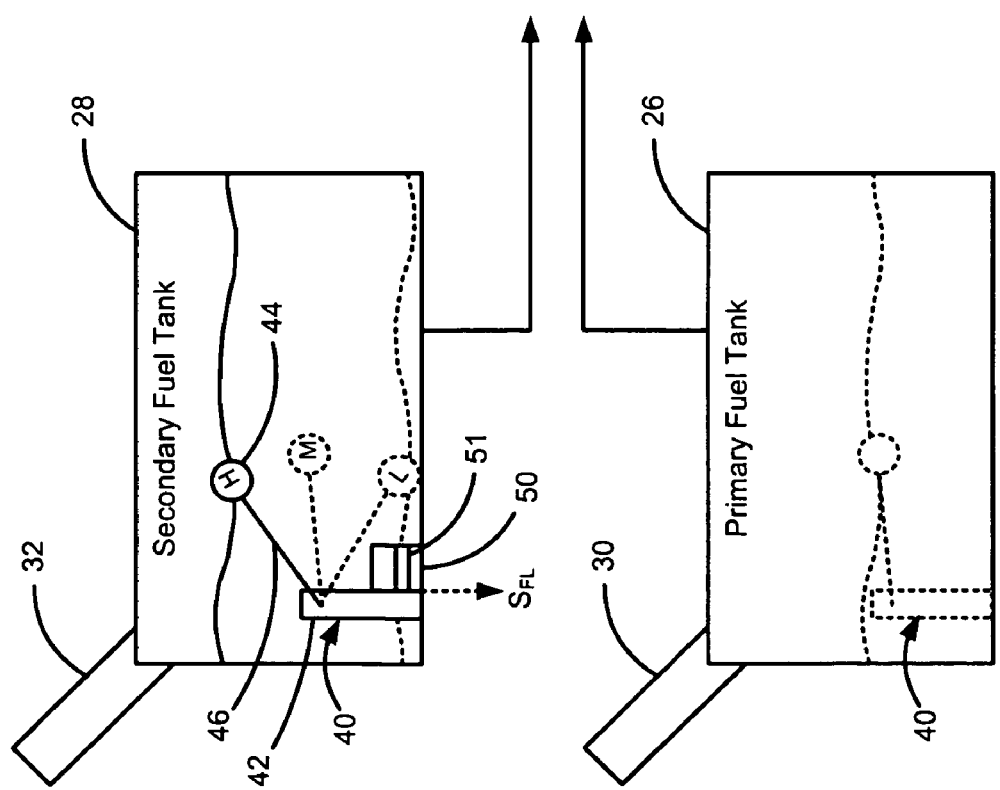
FIG. 2 is a functional block diagram of the primary and secondary fuel tanks.

Referring now to FIG. 2, both the primary and the secondary fuel tanks 26, 28 include a fuel level sensor 40 having a switching unit 42, a float 44 and a lever arm 46. The float 44 is buoyant and floats at the surface of the fuel. As the fuel level increases/decreases, the height of the float 44 relative to the switching unit 42 correspondingly increases/decrease, thereby adjusting a rotational position of the lever arm 46 relative to the switching unit 42. The switching unit 42 includes a variable resistor, the resistance of which is adjusted based on the rotational position of the lever arm 46. For example, if the float 44 is in a high position (H), a first resistance (e.g., 20 Ohms) is provided, if the float 44 is in a mid position (M), a second resistance (e.g., 55 Ohms) is provided, and if the float 44 is in a low position (L) a third resistance (e.g., 230 Ohms) is provided. The secondary fuel tank 28 also includes an empty switch 50 or other resistance device having a float 51 that slides vertically within the empty switch 50, based on the fuel level within the secondary fuel tank 28.

Figure 3:
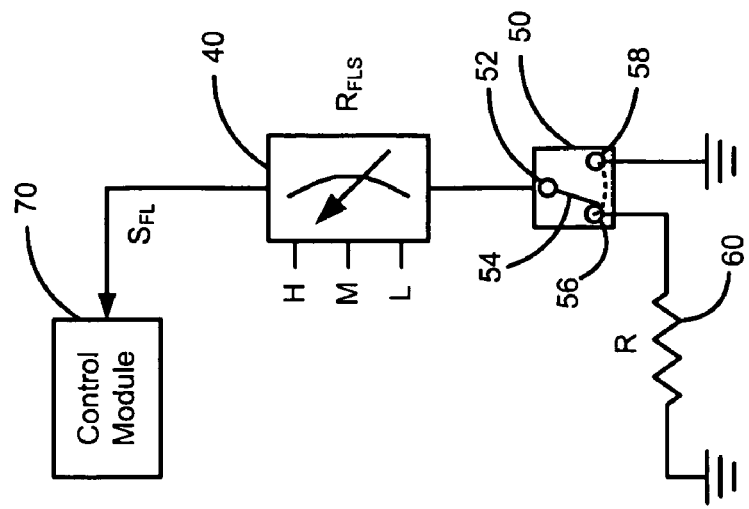
FIG. 3 is a schematic circuit diagram of a sensor system implemented in the secondary fuel tank.

Referring now to FIG. 3, the fuel level sensor 40 and the empty switch 50 are electrically connected in series to provide a total fuel level signal ($S_{FL}$). More specifically, the empty switch 50 includes an output point 52, a switch arm 54 and first and second input points 56, 58. The first input point 56 is electrically connected to a resistor 60 having a fixed resistance (R). The second input point 58 is connected to ground. The switch arm 54 connects the output point 52 to one of the first and second output points 56, 58. For example, when the float 51 of the empty switch 50 is at its lowest position (i.e., when the fuel level is below the empty switch 50), the switch arm 54 connects the output point 52 to the first input point 56. In this manner, R is added to the resistance of the fuel level sensor ($R_{FLS}$). When the float 51 is in its upper most position (i.e., when the fuel level is above the empty switch 50), the output point 52 is connected to the second input point 58 and no additional resistance is added to $R_{FLS}$. $S_{FL}$, which is provided as the total resistance of the fuel level sensor 40 and empty switch 50 is sent to a control module 70 (see FIGS. 1 and 3).

The control module 70 executes the fuel level detection cross-check control of the present invention. More specifically, one of a plurality of fuel level condition flags is set based on $S_{FL}$. The fuel level condition flags include, but are not limited to, an empty tank flag ($FLAG_{ET}$), a first switch stuck flag ($FLAG_{S1}$) (e.g., indicating that the empty switch 50 is stuck in the empty position), a first or second switch stuck flag ($FLAG_{S1,2}$) (e.g., indicating that either the empty switch 50 is stuck in its uppermost position or the fuel level sensor 40 is stuck in its lowest (i.e., empty) position), a full tank flag ($FLAG_{FT}$) and a mid-level flag ($FLAG_{ML}$). The flags are set based on the exemplary truth table below:

| Empty Switch | Fuel Level Sensor | R (Ohms) | $R_{FLS}$ (Ohms) | $S_{FL}$ (Ohms) | Condition Flag |
|---|---|---|---|---|---|
| Low | Low | 250 | 230 | 480 | $FLAG_{ET}$ |
| Low | Mid | 250 | 55 | 305 | $FLAG_{S1}$ |
| Low | High | 250 | 20 | 270 | $FLAG_{S1}$ |
| High | Low | 0 | 230 | 230 | $FLAG_{S1,2}$ |
| High | Mid | 0 | 55 | 55 | $FLAG_{ML}$ |
| High | High | 0 | 20 | 20 | $FLAG_{FT}$ |

The control module 70 indicates the fuel level in the secondary fuel tank 28 based on $FLAG_{ET}$, $FLAG_{ML}$ or $FLAG_{FT}$. If $FLAG_{ML}$, in particular, is set, the control module 70 uses a traditional rationality check to determine whether the fuel level sensor 40 is functioning properly. If one of $FLAG_{S1}$ and $FLAG_{S1,2}$ are set, the control module 70 sets a diagnostic trouble code (DTC) and illuminates a malfunction indicator lamp (MIL) or other visual or audible device to convey to the vehicle operator that there is a malfunction. Further, because the resistances are added in series, current fuel level reading algorithms are still able to be implemented for fuel level determination and existing in range diagnostics still function correctly.

Figure 4:
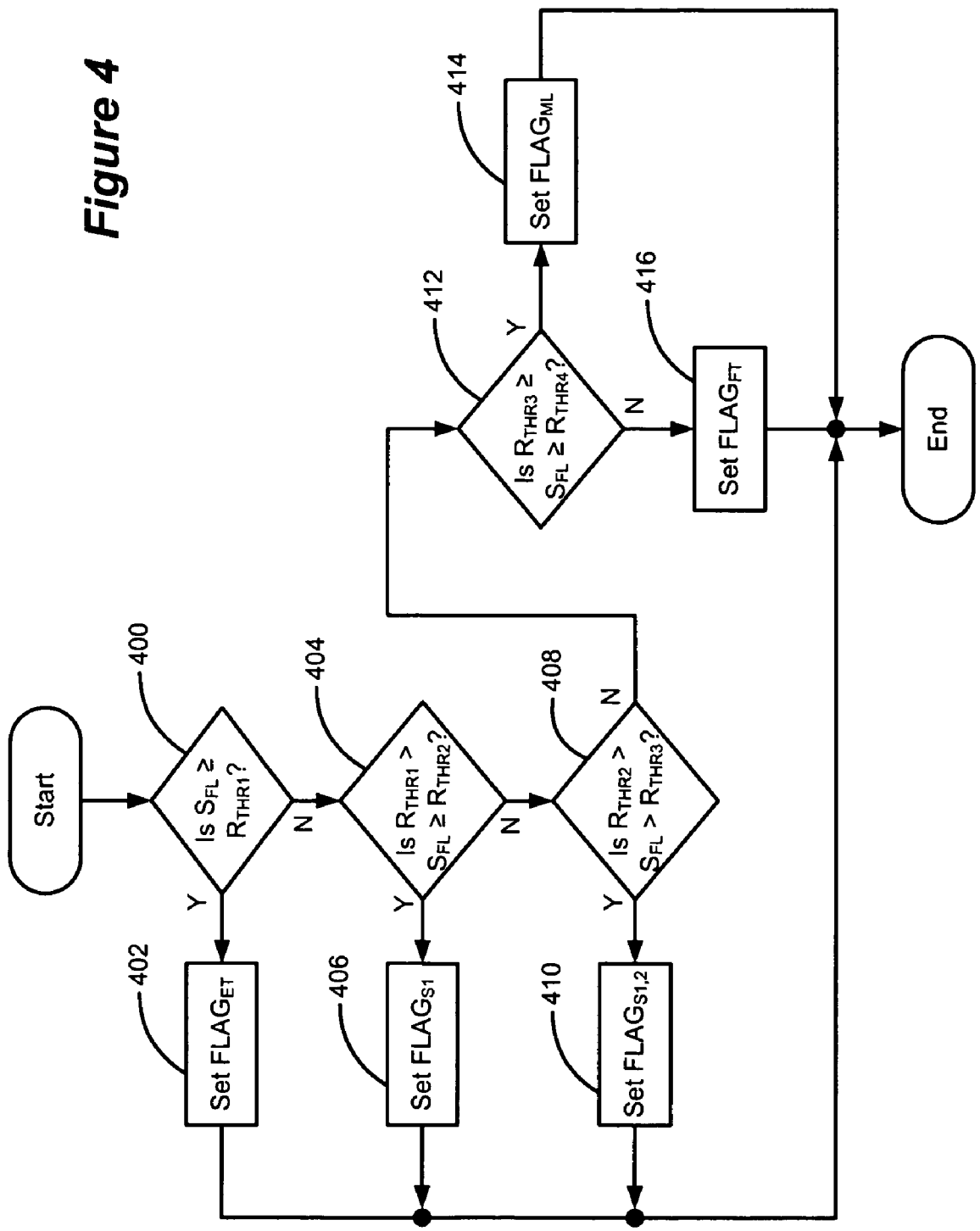
FIG. 4 is a flowchart illustrating exemplary steps executed by the fuel level detection cross-check control of the present invention.

Referring now to FIG. 4, exemplary steps executed by the fuel level monitoring cross-check control will be described in detail. The particular flag is set based on a comparison between $S_{FL}$ and a plurality of resistance thresholds. In step 400, control determines whether $S_{FL}$ is greater than or equal to a first resistance threshold ($R_{THR1}$) (e.g., 480 Ohms). If $S_{FL}$ is greater than or equal to $R_{THR1}$, both switches are functioning properly, control sets $FLAG_{ET}$ in step 402 and control ends. If $S_{FL}$ is not greater than or equal to $R_{THR1}$, control determines whether $S_{FL}$ is less than $R_{THR1}$ and greater than or equal to a second resistance threshold ($R_{THR2}$) (e.g., 270 Ohms) in step 404. If $S_{FL}$ is less than $R_{THR1}$ and greater than or equal to $R_{THR2}$, the empty switch is not functioning properly, control sets $FLAG_{S1}$ in step 406 and control ends. If $S_{FL}$ is not less than $R_{THR1}$ and is not greater than or equal to $R_{THR2}$, control continues in step 408.

In step 408, control determines whether $S_{FL}$ is less than $R_{THR2}$ and greater than a third resistance threshold ($R_{THR3}$) (e.g., 230 Ohms). If $S_{FL}$ is less than $R_{THR2}$ and is greater than $R_{THR3}$, one of the empty switch and the fuel level sensor is not functioning properly, control sets $FLAG_{S1,2}$ in step 410 and control ends. If $S_{FL}$ is not less than $R_{THR2}$ and is not greater than $R_{THR3}$, control determines whether $S_{FL}$ is less than or equal to $R_{THR3}$ and is greater than or equal to a fourth resistance threshold ($R_{THR4}$) (e.g., 20 Ohms) in step 412. If $S_{FL}$ is less than or equal to $R_{THR3}$ and is greater than or equal to $R_{THR4}$, control sets $FLAG_{ML}$ in step 414 and control ends. If $S_{FL}$ is not less than or equal to $R_{THR3}$ and is not greater than or equal to $R_{THR4}$, control sets $FLAG_{FT}$ in step 416 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel level monitoring system for a fuel system having a primary fuel tank and a secondary fuel tank, comprising:
   a fuel level sensor that is disposed within said secondary fuel tank and that generates a first signal;
   an empty switch that is disposed within said secondary fuel tank, that is connected in series with said fuel level sensor, and that generates a second signal, wherein said fuel level sensor outputs a third signal corresponding to a sum of said first and second signals; and
   a control module that determines a condition of one of said fuel level sensor and said empty switch based on comparisons of said third signal and each of a plurality of signal thresholds, wherein said condition includes at least one of a fuel level sensor stuck condition and an empty switch stuck condition.

2. The fuel level monitoring system of claim 1 wherein said control module sets a condition flag based on said condition.

3. The fuel level monitoring system of claim 2 wherein said condition flag indicates one of a fuel tank empty condition, a fuel tank full condition, a normal operating condition, an empty switch stuck condition and a fuel level sensor stuck condition.

4. The fuel level monitoring system of claim 3 wherein said control module generates a diagnostic trouble code and initiates an alert when said condition is one of an empty switch stuck condition and a fuel level sensor stuck condition.

5. The fuel level monitoring system of claim 1 wherein said first signal includes one of a first value, a second value and a third value.

6. The fuel level monitoring system of claim 1 wherein said fuel level sensor is a variable resistor.

7. The fuel level monitoring system of claim 1 wherein said second signal includes one of a first and a second value.

8. A method of evaluating whether a fuel monitoring apparatus is functioning properly, comprising:
generating a first signal using a fuel level sensor disposed within a fuel tank;
generating a second signal using an empty switch disposed within said fuel tank;
determining a condition of one of said fuel level sensor and said empty switch based on said first signal, said second signal and a plurality of signal thresholds; and
adding said first and second signals;
wherein a resultant sum of said first and second signals is compared to each of said plurality of signal thresholds.

9. The method of claim 8 further comprising setting a condition flag based on said condition.

10. The method of claim 9 wherein said condition flag indicates one of a fuel tank empty condition, a fuel tank full condition, a normal operating condition, an empty switch stuck condition and a fuel level sensor stuck condition.

11. The method of claim 8 wherein said first signal includes one of a first value, a second value and a third value.

12. The method of claim 8 wherein said fuel level sensor is a variable resistor.

13. The method of claim 12 wherein said empty switch is connected in electrical series with said fuel level sensor.

14. The method of claim 8 wherein said second signal includes one of a first and a second value.

15. The method of claim 8 wherein said first and second signals are resistances respectively associated with said fuel level sensor and said empty switch.

16. A method of evaluating whether a fuel monitoring sensor is functioning properly, comprising:
providing a fuel system having first and second fuel tanks;
generating a first signal using a fuel level sensor disposed within said secondary fuel tank;
generating a second signal using an empty switch disposed within said secondary fuel tank;
determining a condition of one of said fuel level sensor and said empty switch based on said first signal, said second signal and a plurality of signal thresholds; and
adding said first and second signals, wherein a resultant sum of said first and second signals is compared to each of said plurality of signal thresholds.

17. The method of claim 16 further comprising setting a condition flag based on said condition.

18. The method of claim 17 wherein said condition flag indicates one of a fuel tank empty condition, a fuel tank full condition, a normal operating condition, an empty switch stuck condition and a fuel level sensor stuck condition.

19. The method of claim 16 wherein said first signal includes one of a first value, a second value and a third value.

20. The method of claim 16 wherein said fuel level sensor is a variable resistor.

21. The method of claim 20 wherein said empty switch is connected in electrical series with said fuel level sensor.

22. The method of claim 16 wherein said second signal includes one of a first and a second value.

23. The method of claim 16 wherein said first and second signals are resistances respectively associated with said fuel level sensor and said empty switch.

* * * * *